United States Patent [19]

Kennedy

[11] 3,928,735

[45] Dec. 23, 1975

[54] TRUNK MAKE-BUSY CIRCUIT

[75] Inventor: James Blakely Kennedy, Bexley, Ohio

[73] Assignee: Bell Telephone Laboratories, Incorporated, Murray Hill, N.J.

[22] Filed: Dec. 23, 1974

[21] Appl. No.: 535,564

Related U.S. Application Data

[62] Division of Ser. No. 432,083, Jan. 9, 1974, Pat. No. 3,875,351.

[52] U.S. Cl....... 179/175.3 R; 179/175; 179/18 AB

[51] Int. Cl.$^{2}$....................... H04B 3/46; H04M 3/12

[58] Field of Search...... 179/175.3 R, 175, 175.1 R, 179/1 PC, 18 AB

[56] References Cited

UNITED STATES PATENTS

| | | | |
|---|---|---|---|
| 2,866,005 | 12/1958 | Kupferle | 179/18 AB |
| 2,984,702 | 5/1961 | Semon | 179/1 PC |
| 3,236,948 | 2/1966 | De Monte | 179/1 |
| 3,601,560 | 8/1971 | Garrett et al. | 179/18 AB |
| 3,673,339 | 6/1972 | Korn | 179/18 AB |

*Primary Examiner*—Douglas W. Olms
*Attorney, Agent, or Firm*—D. A. Marshall

[57] ABSTRACT

A trunk make-busy circuit for enabling a test position to access and test the trunk circuits of a telephone central office. The trunk make-busy circuit distinguishes between subscriber busy and trouble busy ones of the trunk circuits and enables the test position to access trouble busy trunk circuits. The trunk make-busy circuit responds to the test position by removing and restoring a trunk circuit for use on subscriber calls.

4 Claims, 1 Drawing Figure

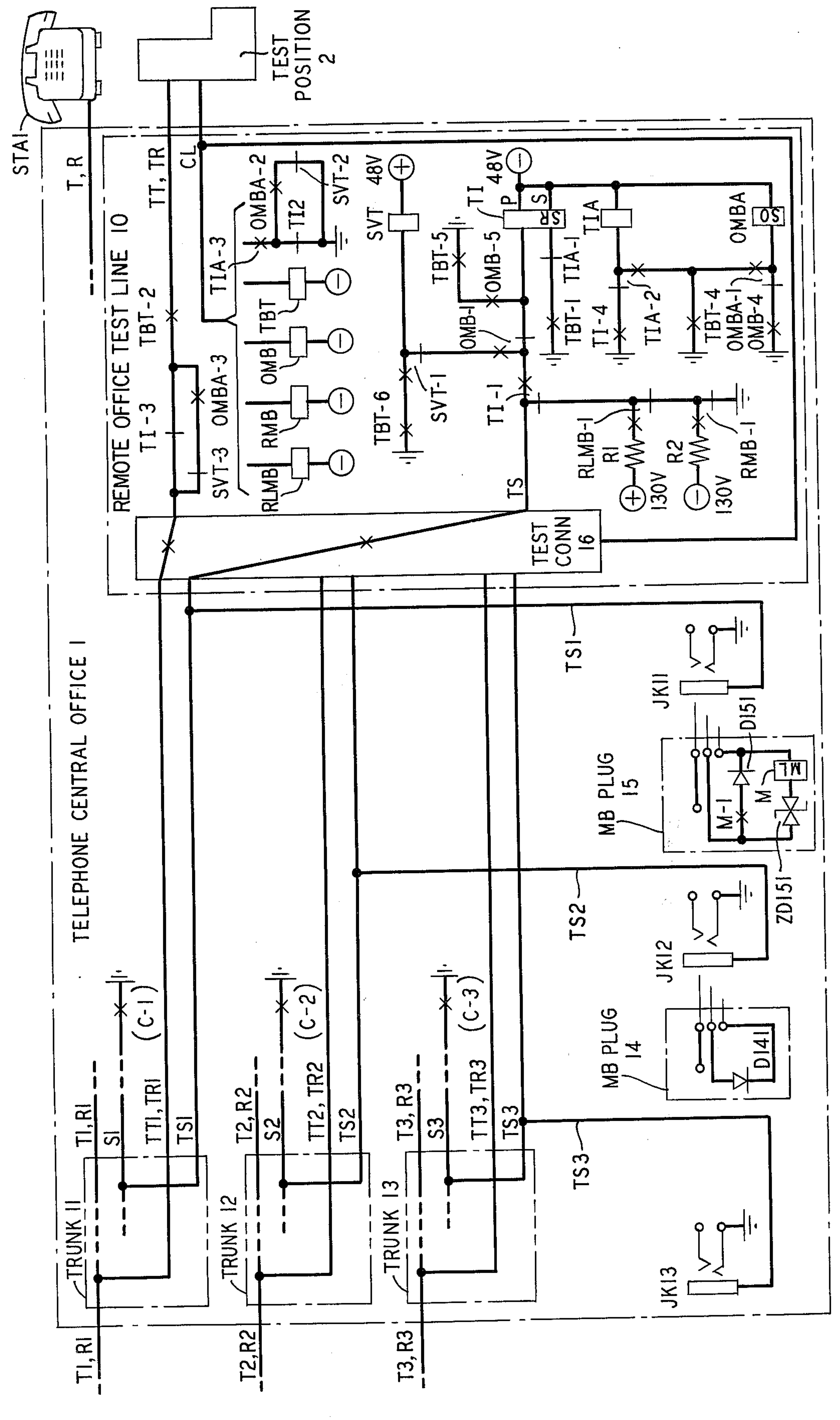
STA1
T, R
TEST POSITION 2
TT, TR
CL
REMOTE OFFICE TEST LINE 10
TELEPHONE CENTRAL OFFICE 1
TEST CONN 16
TS
TS1
TS2
TS3
JK11
JK12
JK13
MB PLUG 15
MB PLUG 14
D151
ZD151
D141
TRUNK 11
TRUNK 12
TRUNK 13
T1, R1
T2, R2
T3, R3
S1
S2
S3
TT1, TR1
TT2, TR2
TT3, TR3
(C-1)
(C-2)
(C-3)
SVT 48V
T1 48V
T1A
OMBA
TBT
OMB
RMB
RLMB
R1
R2
130V

TRUNK MAKE-BUSY CIRCUIT

CROSS REFERENCE TO RELATED APPLICATION

This is a divisional application of copending application, Ser. No. 432,083, now U.S. Pat. No. 3,875,351, filed Jan. 9, 1974.

BACKGROUND OF THE INVENTION

1. Field of the Invention

This invention relates to telephone switching systems. In particular it relates to an arrangement for accessing and testing the trunk circuits of a telephone central office.

2. Description of the Prior Art

Telephone central offices of the telephone switching network are interconnected by trunk circuits arranged to establish and provide call communication paths from calling telephone stations to called telephone stations. Each telephone central office is interconnected by a number of trunk circuits, oftentimes referred to simply as trunks, with certain other telephone central offices and telephone calls between subscribers are established over interconnected ones of the trunks.

Arrangements have been disclosed in the prior art for selecting ones of the trunks at a telephone central office and conducting supervision and transmission tests thereon. These types of tests are required in order to determine the suitability of a trunk for use in providing a high standard of communication service to calling and called telephone subscribers.

The trunks of telephone central offices are oftentimes tested from a common test position that is located remote to the telephone central offices. During a testing sequence the test position selects a particular central office trunk and examines the current operational status thereof. When the selected trunk is found to be idle, the test position accesses the trunk and subsequently conducts supervisory and transmission tests thereon. If the selected trunk is found to be busy, the test position releases the busy trunk and selects another.

Telephone central office maintenance personnel routinely remove trunks that fail on subscriber calls from service by making the trunks appear busy to incoming subscriber calls. Since the central office made-busy trunks have failed on subscriber calls it is highly desirable that the test position obtain access to these trunks for the purpose of locating and correcting the source of the trunk failures. Although the test position detects idle and busy trunks it does not have the capability of distinguishing between trunks busy handling subscriber calls and trunks that have been made trouble busy by maintenance personnel.

Accordingly, a need exists in the art for an arrangement capable of enabling a test position to distinguish between subscriber busy and trouble busy trunks of a telephone central office. A need also exists for an arrangement capable of enabling a test position located remote to a telephone central office to remove from subscriber service trunks found to have a trouble condition and to restore the trunks to subscriber service when the trouble has been cleared.

SUMMARY OF THE INVENTION

In the embodiment of the invention a trunk make-busy plug circuit is provided for use with a test position arranged for conducting operational tests on trunks utilized by a telephone central office to establish subscriber calls between telephone stations. The make-busy plug circuit is arranged to respond to the application of voltages to a trunk busy lead from a test position circuit by removing the trunk from subscriber service and by restoring the trunk to subscriber service. Apparatus of the make-busy plug includes directional current conducting means and is arranged to respond to one applied voltage to make a trunk appear busy by establishing a make-busy path from a ground terminal through the directional current conducting means to the trunk busy lead. The apparatus responds to another one of the applied voltages by interrupting the make-busy path through the directional current conducting means to restore a previously made-busy trunk to subscriber service.

In accordance with one feature of the invention, trunk make-busy plug apparatus is provided for enabling maintenance personnel of a telephone central office to remove a trunk experiencing trouble from subscriber service by inserting the make-busy plug in the make-busy jack of the trunk to return the trunk sleeve lead through a directional conducting diode to ground.

Another feature of the invention is the provision of a trunk make-busy plug for enabling a remote test position to remove a trunk from subscriber service by making the trunk trouble busy and subsequently restoring the trunk to subscriber service by removing the trouble busy. The make-busy plug apparatus includes a latch relay in series with zener diodes connected in parallel with a directional conducting diode in series with a contact of the latch relay. The make-busy plug inserted in a trunk make-busy jack responds to first and second polarity voltages applied to a trunk sleeve lead from the test position by enabling the latch relay to connect and disconnect ground through the directional conducting diode with the trunk sleeve lead.

In accordance with another feature of the invention apparatus included in a trunk make-busy plug enables a remote test position to distinguish between the idle, subscriber busy, and trouble busy states of selected trunks. The trunk make-busy plug inserted in the make-busy jack of a trunk responds to first and second polarity voltages applied under control of the test position to a trunk sleeve lead by enabling a latch relay to connect and disconnect a directional current connecting diode to the sleeve lead to remove and restore the trunk to subscriber service.

DESCRIPTION OF THE DRAWING

The foregoing objects, features and advantages, as well as others of the invention, will be more apparent from a consideration of an illustrative embodiment now to be described with reference to the accompanying schematic drawing. Shown therein is an illustrative trunk make-busy plug for use with telephone central office trunks remotely selected from a test position.

It will be noted that the drawing employs a type of notation referred to as "Detached Contact" in which an X, shown intersecting a conductor, represents a normally open "make" contact of a relay, and a bar, shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing"

by F. T. Meyer in the September 1955 publication of the *American Institute of Electrical Engineers Transactions, Communications and Electronics*, Volume 74, pages 505–513.

GENERAL DESCRIPTION

Referring now to the drawing, it is intended that telephone central office 1 shown thereon be a conventional type of telephone switching system equipped with a number of trunks 11, 12, 13 employed to establish and provide communication paths between subscribers. Each of the trunks 11, 12, 13 is equipped with a correspondingly numbered jack JK11, JK12, JK13 that is used by maintenance personnel of telephone central office 1 to make the trunks appear busy to subscriber calls. Telephone central office 1 is also equipped with remote office test line 10 for the purpose of enabling test position 2 to select ones of trunks 11, 12, 13 and conduct operational tests thereon.

During a subscriber call sequence telephone central office 1 seizes a trunk for subscriber use, such as trunk 13, by placing a ground on trunk sleeve lead S3. After trunk 13 has been seized, a connection is established in the well-known manner with telephone station 1 in order that a communication path may be established through switching equipment over interconnected conductors T, R, and T3, R3 between calling and called subscribers. The ground appearing on trunk sleeve lead S3 maintains the connection during the calling interval and informs the switching equipment of telephone central office 1 that trunk 13 is busy handling a subscriber call.

Maintenance personnel of telephone central office 1 removes a trunk, such as trunk 12, from service by inserting make-busy plug 14 into jack 12. Ground appearing on trunk sleeve lead TS2 through diode D141 prevents the switching equipment of telephone central office 1 from selecting trunk 12 for use on a subscriber call. Trunk 12 may be restored to service by having the maintenance personnel remove make-busy plug 14 from jack JK12.

Test position 2, used to test the trunks of a number of telephone central offices, selects a particular trunk of telephone central office 1 to be tested, for example, trunk 12, by transmitting signals over control lead CL to remote office test line 10. The received signals, in the well-known manner, direct test connector 16 to connect test lead TS of remote office test line 10 with trunk sleeve lead TS2 of trunk 12. In the absence of a ground signal appearing on test lead TS, remote office test line 10 determines that selected trunk 12 is idle and proceeds to connect test leads TT, TR with leads TT2, TR2 in order that test position 2 can perform the necessary tests.

If ground appears on test lead TS, selected trunk 12 is identified by remote office test line 10 as being busy. When selected trunk 12 is found busy, test position 2 enables remote office test line 10 to conduct a subscriber busy and trouble busy test by examining the type of ground appearing on trunk sleeve lead TS2. Diode ground appearing on trunk sleeve lead TS2 informs the circuitry of remote office test line 10 that trunk 12 has been made trouble busy and is therefore available for testing. Test leads TT, TR are then connected with trunk leads T2, R2, via leads TT2, TR2, in order that test position 2 may conduct tests on made-trouble busy trunk 12.

Direct ground appearing on trunk sleeve lead TS2 informs remote office test line 10 that trunk 12 is busy handling a subscriber call and cannot be tested at this time. Test position 2 thereby instructs remote office test line 10 to release from the subscriber busy trunk without interrupting the subscriber call.

Developments in trunk testing have made it highly desirable that a remote make-busy and a remote make-busy release capability be provided for a test position such as test position 2. The present embodiment of the invention provides this capability with make-busy plug 15. Make-busy plug 15 is equipped with latch relay M that is arranged to connect diode D151 in series with the sleeve lead of a trunk. Assuming that make-busy plug 15 has been inserted into jack JK11, trunk 11 can be made busy by having test position 2 direct remote office test line 10 to apply a voltage of a first polarity to test lead TS. This voltage appearing on trunk sleeve lead TS1 operates latch relay M of make-busy plug 15 to connect trunk sleeve lead TS1 to ground through diode D151. After the voltage has been removed the contacts of latch relay M remain operated in order that diode ground may be continued on trunk sleeve TS1 for the purpose of making trunk 11 appear trouble busy to subsequent subscriber calls.

Test position 2 may restore made-busy trunk 11 to subscriber service by directing remote office test line 10 to apply a voltage of a second polarity to trunk sleeve lead TS1. The voltage appearing on trunk sleeve TS1 releases latch M to remove diode ground from trunk sleeve TS1 and thereby return trunk 11 to subscriber use.

In summary, the disclosed embodiment of the invention enables a test position to identify the idle and busy states of selected trunks and to distinguish subscriber busy trunks from trouble busy trunks. In addition, the test position has the capability of removing a trunk experiencing trouble from subscriber service and the capability of restoring the trunk for subscriber usage after the trouble has been located and cleared.

DETAILED DESCRIPTION

A. Selecting Idle Trunks

It is assumed for the present embodiment of the invention that make-busy plugs 14 and 15 shown in the drawing have been inserted by the maintenance personnel of telephone central office 1 into jacks JK12 and JK11, respectively. It is further assumed that trunk 13 is currently in an idle state and that make contacts (C-3) are open thereby preventing ground from appearing on trunk sleeve lead TS3.

Test position 2 selects a trunk for testing, for example, trunk 13, by seizing control line CL and transmitting identifying signals thereover to remote office test line 10. The identifying signals appearing on control line CL direct test connector 16 to connect leads TS, TT, TR with leads TS3, TT3, TR3, respectively. Test position 2 initiates the test sequence on selected trunk 13 by operating trunk busy test relay TBT.

Operation of relay TBT closes make contacts TBT-1 to establish an operate path for relay TI from ground through closed make contacts TBT-1, normal contacts TIA-1 and the secondary winding of relay TI to a −48 volt battery source. The resultant closing of contacts TI-1 extends trunk sleeve lead TS3 through test connector 16 over lead TS and the make portion of transfer contacts TI-1, through the normal portion of transfer contacts OMB-1 and the primary winding of relay TI to the −48 volt battery source. The operation of relay TI also closes make contacts TI-4 to provide an obvious operate path for relay TIA which locks operated to ground through the make portion of transfer contacts TIA-2 and closed make contacts TBT-4. Relay TIA, in operating, opens normal contacts TIA-1 to interrupt the secondary winding operate path of relay TI.

Since ground is not present on trunk sleeve lead TS3 of idle trunk 13, relay TI releases and closes normal contacts TI-2. With normal contacts TI-2 closed, a ground signal is transmitted, through closed make contacts TIA-3 and over control line CL to test position 2 as an indication that trunk 13 is idle and is available for testing. Test position 2 is then enabled to conduct tests on idle trunk 13 on a connection extending over leads TT, TR through make contacts TBT-2, normal contacts TI-3, and leads TT3, TR3 to trunk conductors T3, R3.

At the end of the test sequence test position 2 initiates a disconnect by releasing relay TBT. The resultant opening of make contacts TBT-4 releases relay TIA to restore the trunk test circuitry of remote office test line 10 to an idle state. Subsequently, test position 2 may, in the well-known manner, direct test connector 16 to release trunk 13 and select another trunk for testing.

B. Selection of a Subscriber Busy Trunk

In the event trunk 13 is busy handling a subscriber call, make contacts (C-3) are closed to connect ground to trunk sleeve lead TS3 and telephone station 1 conductors T, R are interconnected in the well-known manner with trunk conductors T3, R3. Test position 2 initiates the test sequence on selected trunk 13 by operating relay TBT. In the aforementioned manner relay TBT closes make contacts TBT-1 to operate relay TI and thereby connect the primary winding of relay TI over lead TS through the normal portion of transfer contacts OMB-1 and the make portion of operated transfer contacts TI-1 with trunk sleeve lead TS3. Current flowing over this path from ground appearing on trunk sleeve lead TS3 and through the primary winding of relay TI maintains relay TI operated when relay TIA operates to open normal contacts TIA-1.

Relay TI, maintained in the operated state from the ground connected to lead TS by subscriber busy trunk 13, prevents the closing of normal contacts TI-2 to return ground over control line CL. The absence of ground on control line CL informs test position 2 that selected trunk 13 is busy and that an additional test must be conducted to determine if trunk 13 is busy on a subscriber call or has been made trouble busy by maintenance personnel.

Test position 2 initiates the additional test by operating relay OMB over control line CL. Operation of relay OMB closes the make portion of transfer contacts OMB-1 to establish a path from lead TS through the normal portion of transfer contacts SVT-1 to the winding of relay SVT. Relay OMB also closes make contacts OMB-5 in order that a hold path for operated relay TI may be maintained to ground through closed make contacts TBT-5. Also occurring with the operation of relay OMB is the establishment of an operate path for slow-operate relay OMBA to ground through the normal portion of transfer contacts OMBA-1 and closed make contacts OMB-4.

Current flows from a +48 volt battery source through the winding of relay SVT, the break portion of transfer contacts SVT-1, the make portion of transfer contacts OMB-1, over lead TS through closed make contacts TI-1, trunk sleeve lead TS3 and closed make contacts (C-3) to ground. The resultant operation of relay SVT opens the break portion of transfer contacts SVT-1 to interrupt this current path, however, relay SVT does not release in that a hold path is established from ground through make portion of operated transfer contacts SVT-1 and make contacts TBT-6.

The operation of relay SVT, which is followed by the operation of slow-operate relay OMBA, opens break contacts SVT-2 prior to the closing of make contacts OMBA-2 to prevent a ground signal from being returned over control line CL to test position 2.

Since a ground signal is not received subsequent to the operation of relay OMB, test position 2 ascertains that selected trunk 13 is subscriber busy and proceeds to release relays OMB and TBT. Release of relays OMB and TBT opens their respective make contacts OMB-4, OMB-5, TBT-1, TBT-4, TBT-5, and TBT-6 to initiate release of relays SVT, TI, TIA, OMBA to restore the trunk test circuitry of remote office test line 10 to the idle state.

C. Selection of a Trouble Made-Busy Trunk

Maintenance personnel of telephone central office 1 busy a trunk, for example, trunk 12, by inserting make-busy plug 14 into jack JK12. The ground from jack JK12 is applied, via the center lead of make-busy plug 14 and diode D141, to trunk sleeve lead TS2 and prevents the switching equipment of telephone central office 1 from selecting trunk 12 for use on a subscriber call. Thus, the use of make-busy plugs enables maintenance personnel to make trouble busy and remove from subscriber use those trunks that failed in establishing and handling subscriber calls.

In the aforementioned manner, test position 2 selects trunk 12 by transmitting signals over control line CL to direct test connector 16 to connect test conductors, TT, TR, TS with trunk conductors TT2, TR2, TS2, respectively. Following the operation of relay TBT, relay TI operates and closes the make portion of transfer contacts TI-1 to connect the primary winding of relay TI with trunk sleeve lead TS2. A path is established from ground through diode D141, over trunk sleeve lead TS2, through test connector 16, the make portion of transfer contacts TI-1, the normal portion of transfer contacts OMB-1 and the primary winding of relay TI to maintain relay TI in the operate state when relay TIA subsequently opens break contacts TIA-1 to interrupt the initial operate path of relay TI. The failure to apply ground through normal contacts TI-2 to control line CL informs test position 2 that selected trunk 12 is busy.

Test position 2 initiates a trunk busy test sequence by operating relay OMB. The operation of relay OMB closes make contacts OMB-4, OMB-5 to provide operate and hold paths for slow operate relay OMBA and relay TI, respectively, and closes the make portion of transfer contacts OMB-1 to connect relay SVT to test lead TS. Since the winding of relay SVT is connected to a +48 volt battery source and operated transfer contacts OMB-1 opened the connection of lead TS with relay TI, diode D141 is reversed biased and thereby prevents the operation of relay SVT.

Subsequently, slow-operate relay OMBA operates and locks operated to ground appearing through closedd make contacts TBT-4 and the make portion of operated transfer contacts OMBA-1. The operation of relay OMBA closes make contacts OMBA-2 and transmits a ground signal through released break contacts SVT-2 and make contacts OMBA-2, TIA-3 over control line CL to test position 2. In addition conductors TT, TR are connected with trunk conductors T2, R2 through closed make contacts TBT-2, OMBA-3, and released break contacts SVT-2.

The ground signal appearing on control line CL notifies test position 2 that selected trunk 12 is trouble busy and that the trunk has been seized and is currently available for testing. After tests have completed on trunk conductors T2, R2 over the path comprising interconnected conductors TT2, TR2, and TT, TR, test position 2 releases relays OMB, TBT to restore the trunk test circuitry of remote office test line 10 to the idle state.

D. Remote Make-Busy and Make-Busy Release of a Trunk

When make-busy plug 15 is inserted into jack JK11, test position 2 is enabled to remotely busy and restore trunk 11 to subscriber service. Make-busy plug 15 comprises diode D151 in series with make contacts M-1 of latch relay M. The winding of latch relay M is connected in series with zener diodes ZD151 and the combination is connected in parallel with diode D151 and series make contacts M-1. Latch relay M is arranged in the well-known manner so that momentary current flow in one direction will operate the relay to close the associated make contacts M-1. The operated make contact M-1 remains in a closed state until current flow in a reverse direction enables latch relay M to release the contacts. Zener diodes ZD151 are selected so that a voltage in excess of 60 volts appearing across the zener diodes enables the zener diodes to conduct current.

Test position 2, having selected idle trunk 11, initiates the sequence to busy selected trunk 11 by momentarily operating remote make-busy relay RMB over control line CL to open the break portion of transfer contacts RMB-1 and remove ground from trunk sleeve lead TS1. Operation of relay RMB closes the make portion of transfer contacts RMB-1 to apply −130 volt battery to test lead TS. Current flowing from ground through zener diodes ZD151 and the winding of latch relay M over leads TS1, TS through the break portion of released relays TI-1, RLMB-1 and make portion of operated relay RMB-1 to −130 volt battery source enables latch relay M to operate and maintain in a closed state, make contacts M-1. Ground is maintained on trunk sleeve lead TS1 through diode D151 and operated make contacts M-1 after the release of remote office test line 10 in order to make trunk 11 appear busy to the switching equipment of telephone central office 1.

Made-busy trunk 11 is returned to subscriber service by test position 2 directing remote office test line 10 to access made-busy trunk 11 and by operating release make-busy relay RLMB. Operation of relay RLMB closes the make portion of transfer contacts RLMB-1 to place +130 volt battery on test lead TS. Current flows from the +130 volt battery through the make portion of transfer contacts RLMB-1, the normal portion of transfer contacts TI-1, over leads TS, TS1, through the winding of make-busy plug 15, latch relay M and zener diodes ZD151 to ground. Latch relay M responds by opening make contacts M-1 to interrupt the path from ground through diode D151 to trunk sleeve lead TS1. After the release of remote office test line 10 by test position 2, trunk 11, having diode ground removed from trunk sleeve lead TS by make-busy plug 15, is restored to subscriber service.

SUMMARY

It is obvious from the foregoing that the flexibility, economy, and efficiency of telephone switching systems may be enhanced by the provision of trunk make-busy plug apparatus arranged for enabling a remote test position to select and test the trunks of telephone central offices. It is further obvious from the foregoing that the aforesaid trunk make-busy plug apparatus arrangement enables a test position to select telephone central office trunks, remove ones of the trunks from service, and restore the trunks to service after trouble has been corrected without requiring the services of maintenance personnel.

While the apparatus has been disclosed for use with the switching equipment of a telephone central office, it is to be understood that such an embodiment is intended to be illustrative of the principles of the invention and that numerous other arrangements may be directed by those skilled in the art without departing from the spirit and scope of the invention.

What is claimed is:

1. A make-busy plug for use in removing a telephone central office trunk from subscriber service and for use in restoring the trunk to subscriber service by a trunk test circuit arranged to selectively apply voltages between a busy lead of the trunk and a ground terminal comprising directional current conducting means for making the trunk appear busy, and means responsive to one of the applied voltages for establishing a make-busy path from the ground terminal through said directional current conducting means to the busy lead and to another one of the applied voltages for interrupting said established make-busy path.

2. The make-busy plug set forth in claim 1 wherein said establishing and interrupting means comprises a latch relay connected in series with zener diodes, said latch relay responsive to current flow in one direction for closing make contacts and responsive to current flow in another direction for releasing said make contacts, and wherein said directional current conducting means comprises a diode connected in series combination with said make contacts, said series combination connected in parallel with said latch relay and said zener diodes.

3. A make-busy plug for use in removing a telephone central office trunk from subscriber service and for use in restoring the trunk to subscriber service by a trunk test circuit arranged to selectively apply positive and negative voltages between a busy lead of the trunk and a ground terminal comprising a diode for making the trunk appear busy to subscriber calls and trouble busy to the trunk test circuit, a latch relay responsive to the applied negative voltage for closing make contacts and to the applied positive voltage for releasing said make contacts, a first control path serially insertable between the busy lead and the ground terminal for enabling said latch relay and comprising zener diodes connected in series with said latch relay, and a second control path connected in parallel with said first control path and comprising the diode connected in series with said make contacts.

4. A make-busy plug for use in removing a telephone central office trunk from subscriber service by establishing a connection from a ground terminal with a make-busy terminal of the trunk and for use in restoring the trunk to subscriber service by interrupting the connection in response to a trunk test circuit applying voltages to a lead connected with the make-busy terminal comprising a first terminal connectable with the ground terminal, a second terminal connectable with the trunk make-busy terminal, a latch relay having a coil winding responsive to one of the applied voltages for closing make contacts and responsive to another of the applied voltages for releasing said make contacts, a control path connected between said first and said second terminals for enabling said latch relay and comprising zener diodes connected in series with said latch relay coil winding, and a make-busy path connected between said first and said second terminals in parallel with said control path and comprising a diode connected in series with said make contacts.

* * * * *